United States Patent [19]

Cimini et al.

[11] Patent Number: 5,022,730

[45] Date of Patent: Jun. 11, 1991

[54] WAVELENGTH TUNABLE OPTICAL FILTER

[75] Inventors: Leonard J. Cimini, Howell; Isam M. I. Habbab, Old Bridge; Sheryl L. Woodward, Lincroft, all of N.J.

[73] Assignee: AT&T Bell Laboratories, Murray Hill, N.J.

[21] Appl. No.: 449,040

[22] Filed: Dec. 12, 1989

[51] Int. Cl.$^5$ .............................................. G02B 6/10
[52] U.S. Cl. ................................................. 350/96.13
[58] Field of Search ................. 350/96.13, 96.14, 96.19

[56] References Cited

U.S. PATENT DOCUMENTS

| | | | |
|---|---|---|---|
| 4,057,321 | 11/1977 | Mahlein et al. | 350/96 |
| 4,750,801 | 6/1988 | Alferness | 350/96 |
| 4,919,507 | 4/1990 | Evans et al. | 350/96.19 |

OTHER PUBLICATIONS

L. G. Kazovsky et al., "Distributed Bragg Reflector Optical Filters", Optical Communication (ECOC'89), The Swedish Exhibition and Congress Center, Gothenburg, Sweden, Sep. 10–14, 1989, vol. 1, pp. 25–28.
T. Numai et al., "Tunable Wavelength Filters Using 2/4-Shifted Waveguide Grating Resonators", Appl. Phys. Lett. 53 (2), 11 Jul. 1988, pp. 83–85.
T. Numai et al., "1.5 μm Tunable Wavelength Filter Using a Phase-Shift-Controlled Distributed Feedback Laser Diode with a Wide Tuning Range and a High Constant Gain", Appl. Phys. Lett. 54(19), 8 May 1989, pp. 1859–1860.
H. Kobrinski et al., "Wavelength-Tunable Optical Filters: Applications and Technologies", IEEE Comm. Magazine, Oct. 1989, pp. 53–63.

Primary Examiner—William L. Sikes
Assistant Examiner—Robert E. Wise
Attorney, Agent, or Firm—Samuel H. Dworetsky

[57] ABSTRACT

A wavelength tunable optical filter having a characteristic single transmission peak for enhanced tunability comprises a phase control section positioned between a Distributed Bragg Reflector section and a high reflectivity mirror. The Distributed Bragg Reflector section comprises a periodic region grating positioned over an end portion of a passive waveguide whereas the phase control section comprises the portion of the passive waveguide region located between the grating and the mirror. Continuous tunability in the range of several THz may be achieved by controlling the refractive index in either the phase control or distributed Bragg reflector section. The optical filter is expected to have a frequency switching time of a few nanoseconds and, thus, is applicable to both transmission and switching applications.

9 Claims, 4 Drawing Sheets

100

WAVELENGTH TUNABLE OPTICAL FILTER

TECHNICAL FIELD

This invention relates generally to the field of optical devices and, more particularly, to wavelength tunable optical filters.

BACKGROUND OF THE INVENTION

The virtually unlimited optical bandwidth in fibers has motivated researchers and developers to shift certain network operations to the optical frequency domain for improving a system's performance and transmission capacity. Generally, this has been effected by utilizing wide band communications networks which allocate channels in the optical frequency domain. Moreover, these networks usually employ both wavelength division multiplexing and wavelength division switching for achieving multi-channel operation.

Wavelength filters, which connect and tune between channels, are one of the key devices required for the above stated networks. For example, in subcriber loop networks, all channels may be broadcast to every subscriber in the network, with the subscriber selecting the desired channel(s) via a tunable optical filter. As might be expected, several types of tunable wavelength filters have been proposed in the literature. For a review of wavelength tunable optical filters, see Kobrinski et al., *IEEE Communications Magazine*, pp. 53-63 (1989). In each of the proposed optical filters, the filtering mechanism may be viewed as a coupling mechanism between wave eigenmodes caused by some perturbative mechanism, e.g. resonant cavity, to effectuate the filtering action. Among the various filters proposed, such as electro-optic devices, acoustic-optic devices, Distributed Bragg Reflector devices, and Distributed Feedback devices, each may be described in the above manner.

It is well known that resonant cavities have a transmission characteristic with peaks and nulls in the frequency domain and that such a characteristic can be used advantageously for optical filtering. However, resonant cavities generally exhibit multiple transmission peaks that correspond to the longitudinal modes of the cavity which limit the tuning range since the mode spacing corresponds to the maximum range over which incoming signals can be spaced without overlapping. Resonant cavities, moreover, have usually been realized by using Fabry-Perot etalons which are difficult to integrate on a photonic integrated circuit. Because of these limitations, various new resonant structures have been designed for extending the tuning range and for achieving integratability. They include resonant laser structures that are biased below their lasing thresholds in their operation as resonant amplifiers. With respect to wavelength tunable optical filters, selected documents as discussed below are of interest.

U.S. Pat. No. 4,057,321 discloses a spectroscopically selective filter comprising two Bragg reflectors with Distributed Feedback disposed on a film waveguide in a tandem arrangement. In addition, applying a voltage via a pair of electrodes, arranged on opposite surfaces of the waveguide, and between the two reflectors, adjusts the optical path length between reflectors for achieving tunability in a manner analogous to a Fabry-Perot arrangement. While tunability is achieved, the filters exhibit a transmission peak of $\sim$6-10 Å located between two reflective regions, known as the stopband. More importantly, outside the stopband the transmission is high and, as such, it limits the usable tuning range to the width of the stopband region, typically less than 800 GHz.

U.S. Pat. No. 4,750,801 discloses a grating resonator filter for achieving a filter bandwidth less than 1 Angstrom. The filter comprises first and second grating sections which are geometrically in phase with each other. That is, the distance between a grating peak in one section and any one grating peak in the second grating section is an integer number of grating periods. Furthermore, a phase section between the two grating sections, having a reduced refractive index, yields a $\pi/2$ (90°) phase shift between the two grating sections. Similar approaches, but utilizing carrier injection have been used to achieve tunability with ranges of approximately 40-50 Angstroms. See, for example, T. Numai et al., *Appl. Phys. Lett.*, Vol. 53, No. 2, pp. 83-85 (1988).

Numai et al., in *Appl. Phys. Lett.*, Vol. 54., No. 19, pp. 1859-60 (1989), have shown that, in addition to tunability, constant transmissivity and constant bandwidth may be achieved by utilizing a multielectrode Distributed Feedback laser diode configuration. The filter consists of three sections; a phase control section between two active sections with Distributed Feedback. While the gain is controlled by current injection in the active section, the tuning is separately controlled by current injected through the phase control section. Tuning ranges of 120 GHz (9.5 Å) with 24.5 dB constant gain were achieved in this particular case. Furthermore, narrow-band tunable optical filters having a net optical gain have been demonstrated which employ a Distributed Bragg Reflector structure. See Kazovsky et al., *ECOC* 1989 *Proceedings*, pp. 25-7. Specifically, Kazovsky et al. utilize a three section structure comprising a phase control section between a Distributed Bragg Reflector and an active section. A resonator is established between the reflector and the interface between the active section and air. In operation, current in the grating section is used to tune the resonant frequency while current in the active section adjusts the optical gain of the filter. As with all the various optical filters described above, the filter exhibits multiple transmission peaks which effectively decreases the tuning range. While Kazovsky et al. suggest that a single transmission peak may be achieved if the length of the phase control section is zero, this is undesirable since tuning would be discontinuous because phase matching between the reflector and the interface could only be achieved at non-continuous wavelengths.

Tunable wavelength optical filters having a wide tuning range which would increase the number of available tunable channels, especially in subscriber loop networks, would be of considerable interest. However, while it is desirable to also minimize the attenuation in the filter, such as by employing an active section, it has been established that the spontaneous emission in the active region generates noise which may have a deleterious effect on its operation. Furthermore, employing an active section causes the filtered output signal to vary nonlinearly with the input signal unless the bias current is adjusted to compensate for such nonlinearity. A related issue is that a low ratio of the filter bandwidth to tuning range limits the number of available channels for a given crosstalk level.

SUMMARY OF THE INVENTION

A wavelength tunable optical filter having a characteristic single transmission peak for enhanced tunability comprises a phase control section positioned between a Distributed Bragg Reflector section and a high reflectivity mirror. Continuous tunability in the range of several THz may be achieved by controlling the refractive index in either the phase control or Distributed Bragg Reflector section.

In one exemplary embodiment, a Distributed Bragg Reflector and phase control sections are disposed on a substrate, with the end facet of the phase control section coated with a high-reflectivity mirror. The Distributed Bragg Reflector section comprises a periodic grating positioned over an end portion of a passive waveguide region whereas the phase control section comprises the portion of the passive waveguide region located between the periodic grating and the mirror. In operation, filtering is based upon the principle that a resonant optical cavity between the mirror and the periodic grating is formed, which produces a strong resonance near the Bragg frequency, if the round-trip optical path length therebetween is an integer multiple of $2\pi$ at that frequency.

In accordance with the principles of the invention, the optical filter may be integrated in photonic circuits and used as a tunable receiver. Moreover, the optical filter, with an expected frequency switching time of a few nanoseconds, may be used for both transmission and switching applications.

BRIEF DESCRIPTION OF THE DRAWING

The invention will be more readily understood after reading the following detailed description of a specific illustrative embodiment of the invention in conjunction with the appended drawings wherein.

DETAILED DESCRIPTION

Figure 1:
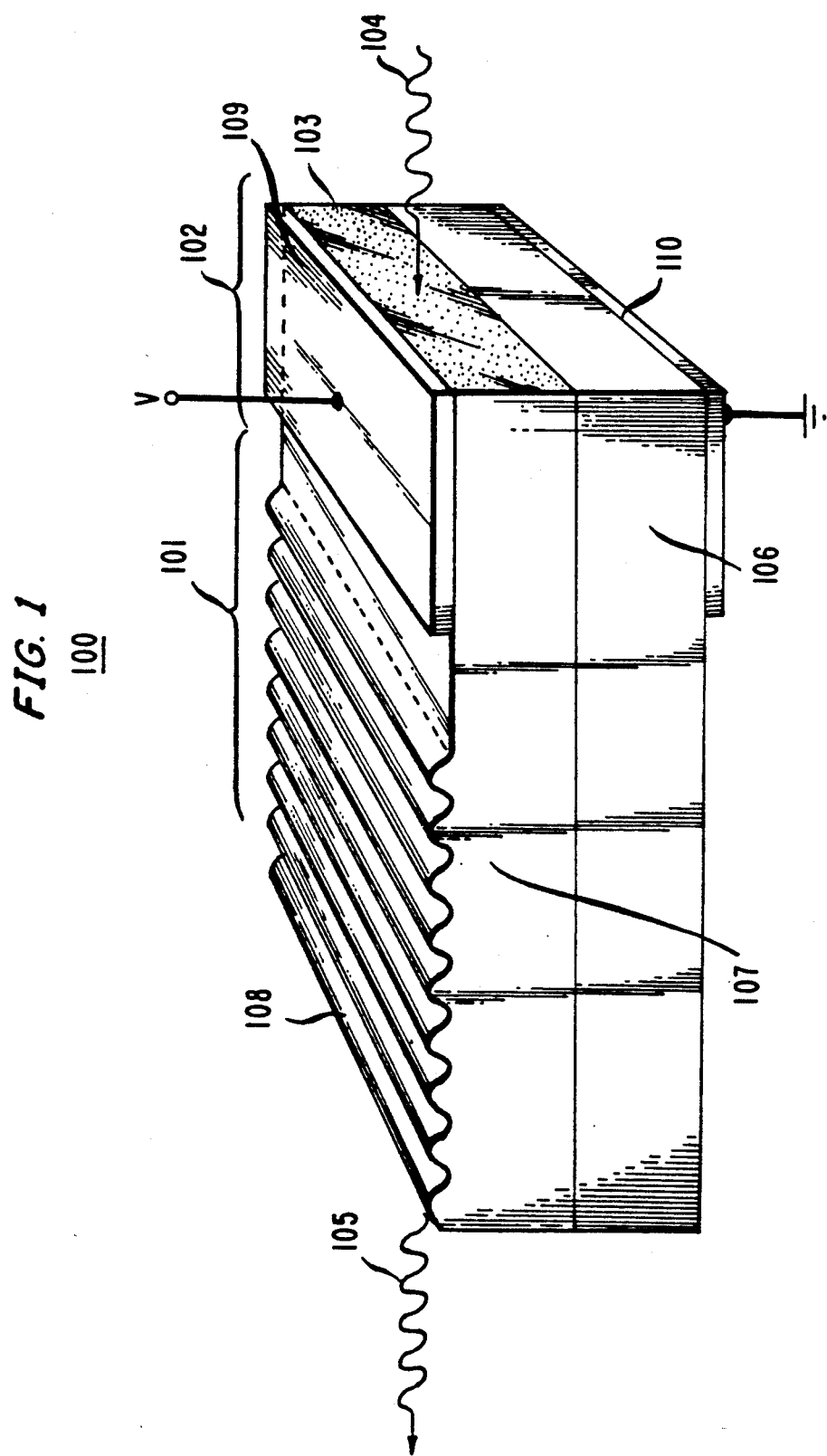
FIG. 1 is a cross-sectional view of a wavelength tunable optical filter in accordance with the principles of the invention.

An exemplary embodiment of a wavelength tunable optical filter in accordance with the principles of this invention is schematically depicted in FIG. 1. Optical filter 100 comprises Distributed Bragg Reflector (DBR) section 101 and phase control section 102, which are disposed on substrate 106, with the end facet of phase control section 102 coated with high-reflectivity mirror 103. Substrate 106 has a lower refractive index than do the DBR and phase control sections. DBR section 101 comprises periodic grating 108 (i.e., Distributed Bragg Reflector) and the region of passive waveguide region 107 located underneath, whereas phase control section 102 comprises the portion of passive waveguide region 107 that is located between periodic grating 108 and high-reflectivity mirror 103.

Without any loss of generality or applicability for the principles of the present invention, passive waveguide region 107 supports the propagation of optical signal 104 until filtered optical signal 105 egresses from optical filter 100. In general, passive waveguide region 107 is understood to include dielectric waveguides, multiple quantum well waveguides, metal-indiffused lithium niobate or lithium tantalate waveguides, and the like. In addition, periodic grating 108 causes substantially spatially periodic perturbations to occur in a portion of passive waveguide region 107. Desirably, passive waveguide region 102 has a refractive index, which can varied by applying an electrical field thereto via electrical contacts 109 and 110 or by injecting a current therein, for obtaining a desired relative phase between periodic grating 108 and mirror 103 or for changing the Bragg frequency associated with periodic grating 108.

In operation, filtering is based upon the principle that a resonant optical cavity between mirror 103 and periodic grating 108 is formed, which produces a strong resonance near the Bragg frequency $f_B$, if the round-trip optical path length therebetween is an integer multiple of $2\pi$ at that frequency. For strong resonance near the Bragg frequency, high reflectivity mirror 103 should have a reflectivity comparable to the peak reflectivity of periodic grating 108, which is typically greater than 0.7. Additionally, only one Fabry-Perot mode of the cavity formed by periodic grating 108 and mirror 103 should fall under the mainlobe of the transmission characteristic of periodic grating 108. To obtain the required phase shift, the optical path length in phase control section 102 may be adjusted, such as by varying its refractive index. In contradistinction to Fabry-Perot etalons, which have periodic transmission peaks, or to prior art Distributed Feedback based optical filters, which have a transmission peak in a narrow region of low transmission surrounded by high transmission regions, optical filter 100 has substantially only one transmission peak because of the high reflectivity of mirror 103 coupled with the frequency selective reflectivity of periodic grating 108 and the relationship therebetween.

Conventional fabrication techniques, such as liquid phase epitaxy, molecular beam epitaxy or vapor phase epitaxy, which are well known in the art, may be used to fabricate optical filter 100. In fabricating periodic grating 108 on the surface of passive waveguide region 107, standard masking and etching techniques may be employed, including interferometric or holographic techniques. Shape, depth and pitch or period of grating 108 are variable and depend on the grating placement together with the result desired therefrom.

It is understood that waveguide region 107 is passive, that is, its band-gap energy is higher than the photon energy of the wavelength associated with the characteristic transmission peak of optical filter 100. End facet of phase control section 102 may be coated, for example, by a highly reflective thin film or metallic film by an evaporative processing in order to fabricate mirror 103.

Figure 2:
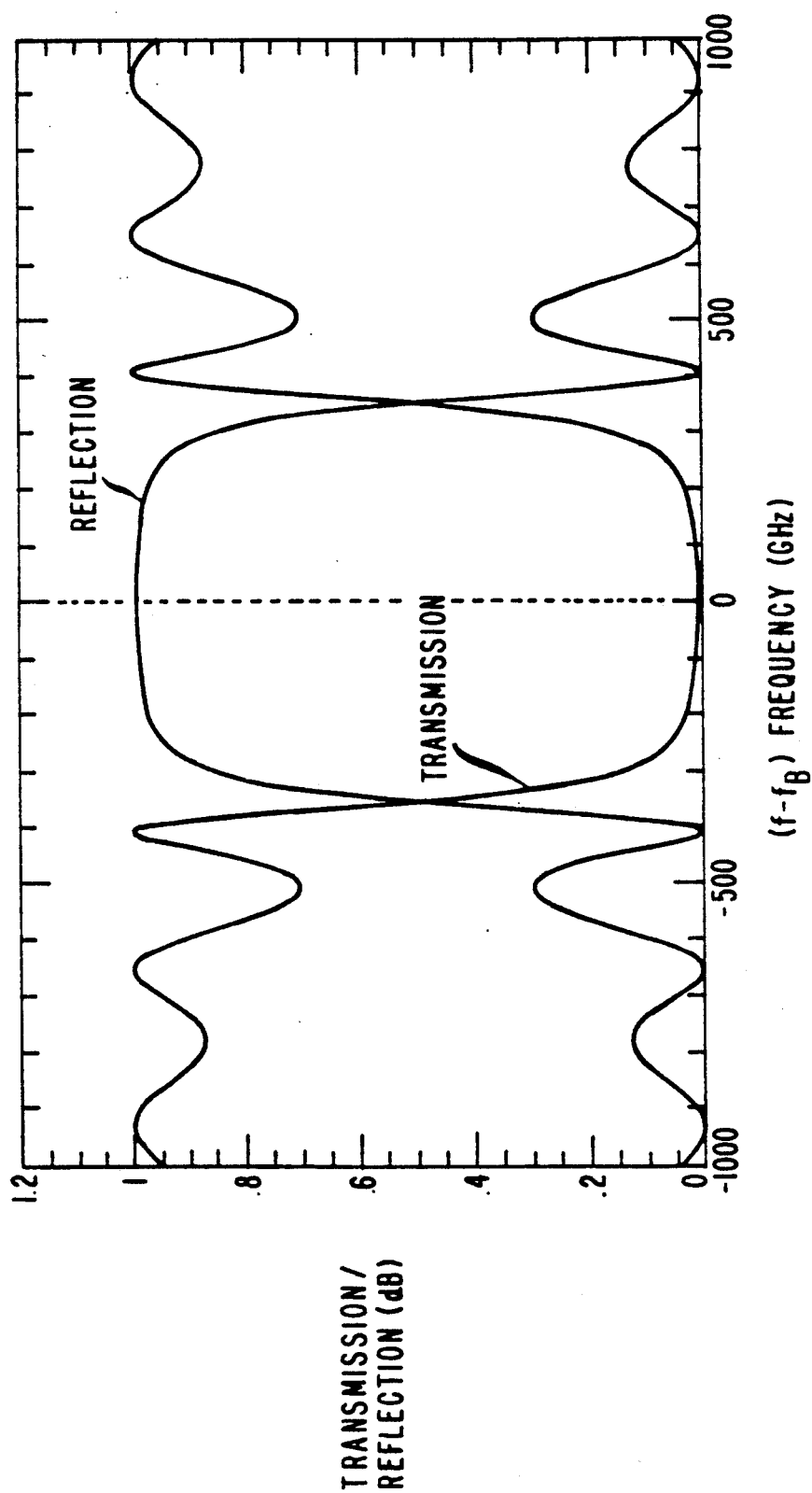
FIG. 2 shows the reflection and transmission characteristics of a Distributed Bragg Reflector section as a function of frequency.

As shown in FIG. 1, DBR section 101 comprises periodic grating 108 and a portion of passive waveguide region 107. DBR section 101 exhibits transmission and reflection properties that are characterized by a mainlobe centered on the resonance or Bragg frequency $f_B$, typically a few nanometers wide as shown in FIG. 2. For a first-order grating positioned over a waveguiding region, the Bragg frequency $f_B$ is given by:

$$2\pi f_B = \omega_B = \frac{\pi c}{n_{eff}\Lambda} \quad (1)$$

where $n_{eff}$ is the effective index of the guided mode in the waveguide region and $\Lambda$ is the grating period. It should be noted that the periodic grating exhibits the maximum or peak reflectivity at the Bragg frequency $f_B$.

With respect to the present optical filter, light incident on DBR section 101 generates two slowly-varying counter-propagating waves which obey the following equations:

$$\frac{dR(z)}{dz} - (\alpha - j\delta) R(z) = -j\kappa S(z) \quad (2)$$

$$\frac{dS(z)}{dz} + (\alpha - j\delta) S(z) = +j\kappa R(z) \quad (3)$$

$$\delta = \frac{n_{dbr}(\omega - \omega_B)}{c} \quad (4)$$

where $R(z)$ and $S(z)$ are the complex amplitudes of the two waves, $\delta$ is a measure of the deviation from the radian Bragg frequency $\omega_B$; c is the speed of light in vacuum; $n_{dbr}$ is the refractive index in the DBR section; $-\alpha$ is the amplitude loss per centimeter; and $\kappa$ is the coupling constant. Those skilled in the art will note that the coupling constant $\kappa$ is determined by the change in the effective index of the waveguide region caused by grating 108, i.e., corrugation depth, refractive indices of the waveguide, and the location of the grating. The general solution to the above equations is well known in the art. See, for example, H. Kogelnik et. al., *J. Appl. Phys.*, Vol. 43, No. 5, pp. 2327-35 (1972). Additionally, the two counter-propagating waves must satisfy certain wave equations within phase control section 102 and the following boundary conditions: $S(L_{pc})=r.R(L_{pc})$, where r is the reflectivity of the mirror; and the complex amplitudes $R(z)$ and $S(z)$ are continuous at the interface between the DBR and phase control sections. Under these boundary conditions, the power transmission of optical filter 100 is found to be given by:

$$T = \frac{(1-r)}{(1+r)} \left| \frac{\gamma(1 + r)e^{-jk_{pc}L_{pc}}}{(j\kappa r e^{-2jk_{pc}L_{pc}} - (\alpha - j\delta)) \sinh(\gamma L_{dbr}) + \gamma \cosh(\gamma L_{dbr})} \right|^2 \quad (5)$$

where $L_{dbr}$ is the length of DBR section 101, $\gamma$ is a complex propagation constant given by $\kappa^2+(\alpha-j\delta)^2$, $L_{pc}$ is the length of phase control section 102, $n_{pc}$ is the refractive index of phase control section 102, and $k_{pc}$ is given by $(\omega n_{pc}/c)+j\alpha$.

Figure 3:
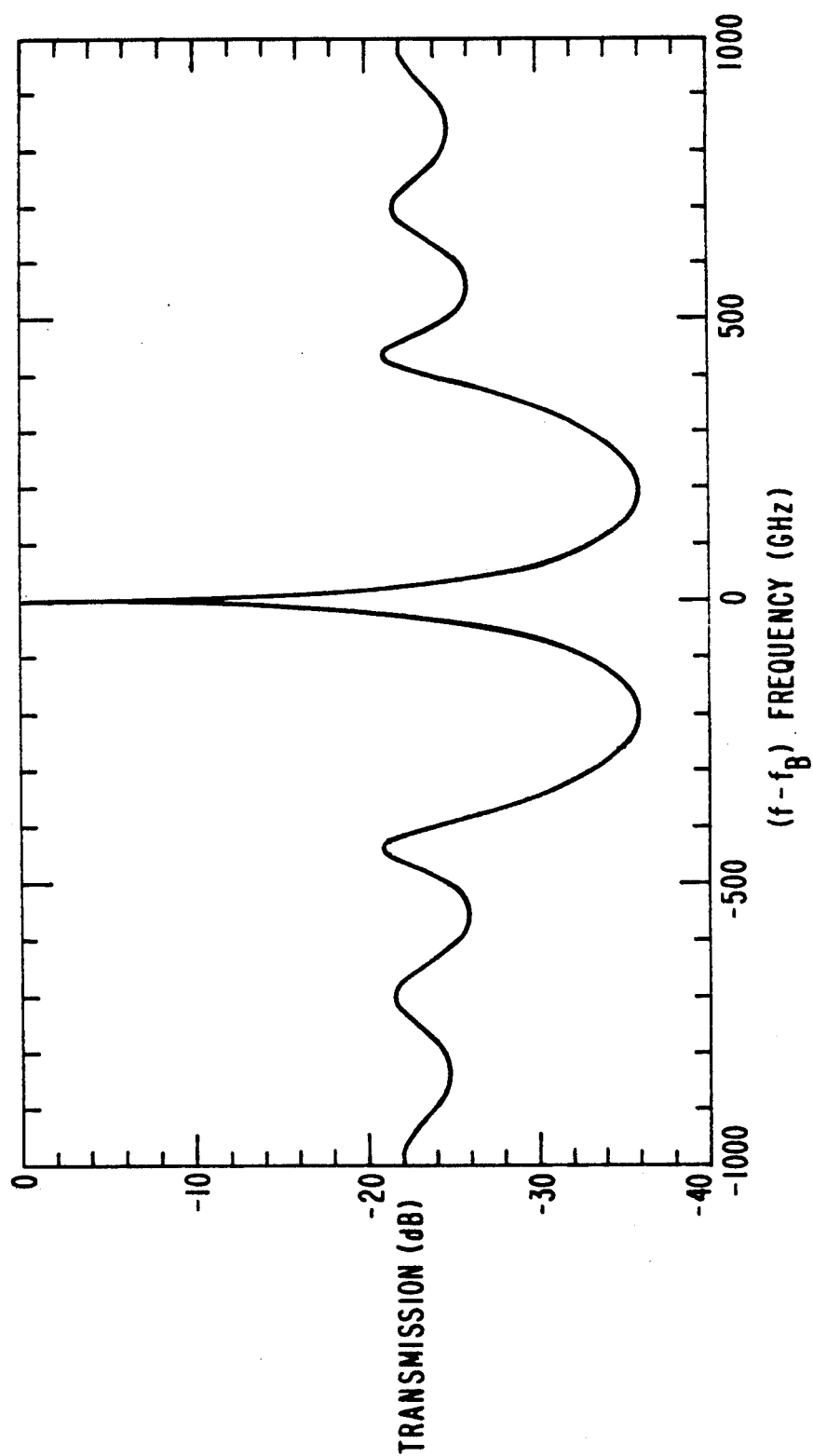
FIG. 3 shows the transmission characteristic of the optical filter shown in FIG. 1.

In an example from computer simulation, the power transmission of optical filter 100 was calculated from equation (5) with the following parameters: $L_{dbr}=150$ μm; $L_{pc}=50$ μm; $\kappa L_{dbr}=3$; $r^2=0.995$; and $\alpha=-0.055$ cm$^{-1}$. Referring to FIG. 3, which depicts the characteristic transmission of optical filter 100 with the above parameters and a phase shift of $\pi/2(90°)$, it should be noted that a 3 dB bandwidth less than 5 GHz with a peak-to-valley ratio better than 29 dB was obtained. Additionally, with a peak-to-sidelobe ratio better than 19 dB, a single channel may be selected from a plurality of wavelength division multiplexed signals without requiring them to be confined in the central mainlobe of periodic grating 108. This assumes, of course, that a crosstalk of 19 dB is acceptable. It was further estimated that the insertion loss was less than 1 dB.

Figure 4:
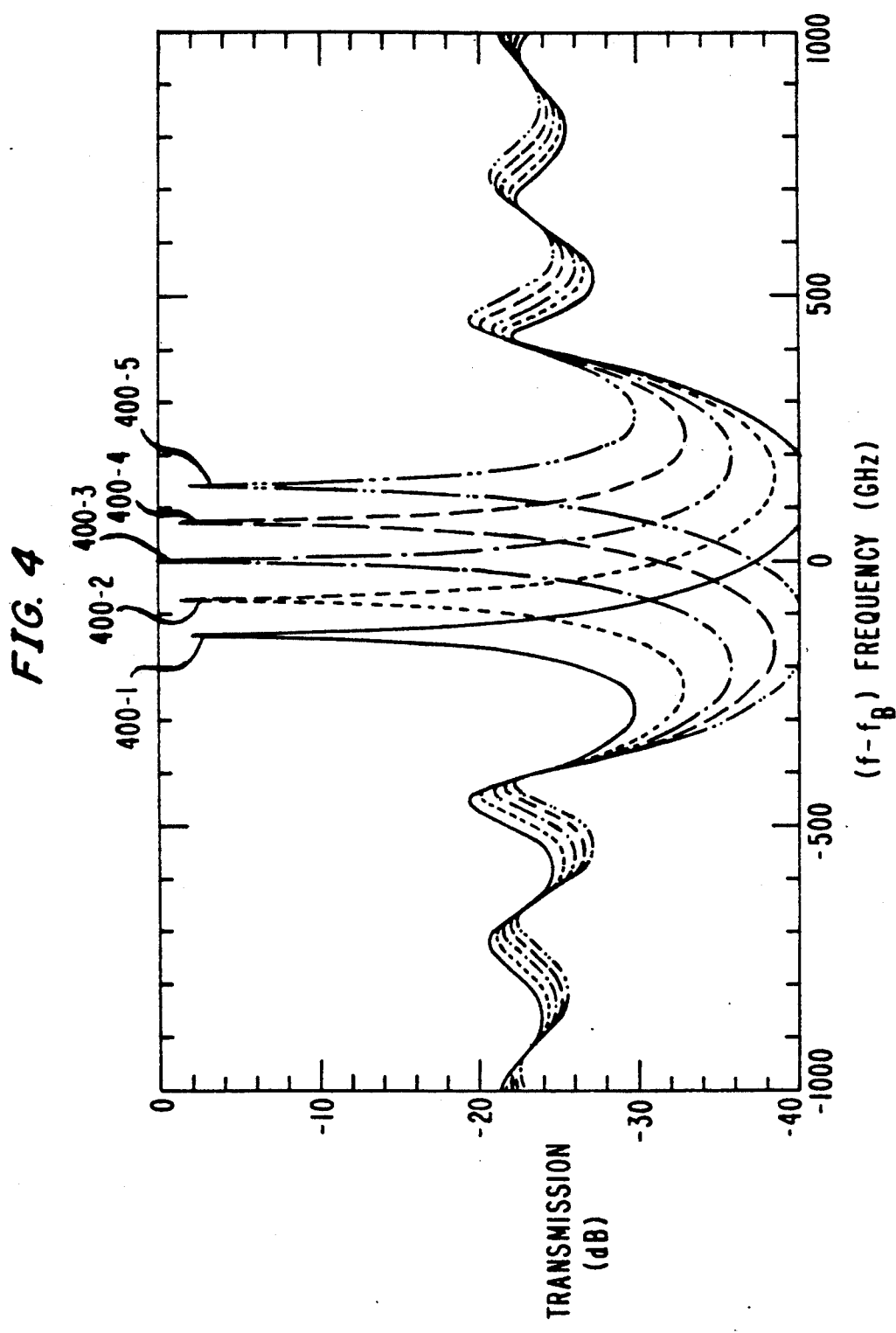
FIG. 4 shows the transmission characteristics of the optical filter shown in FIG. 1 as the optical phase shift is varied from 60° to 120°.

As stated aboveherein, tuning may be achieved by current injection in phase control section 102, which in turn determines the effective refractive index of that material vis-a-vis free-carrier absorption. Illustrated in FIG. 4 are the transmission characteristics of optical filter 100 for different values of phase shifts between periodic grating 108 and high-reflectivity mirror 103. Curves 400-1 through 400-5 represent the transmission characteristics for phase shifts from 60° to 120° in steps of 15°, respectively. Moreover, it is further possible to shift transmission curves 400-1 to 400-5 by changing the Bragg frequency, such as by varying the refractive index of the DBR section. Accordingly, fine and coarse tuning may then be obtained by changing the refractive index of the phase control and DBR sections, respectively, resulting in continuous tuning over a wide range of frequencies. It is contemplated that metallic contacts to either the phase control or DBR section can provide means for attaching a source of electrical potential thereto for injecting current into that region. Standard ohmic contact fabrication techniques such as multilayer evaporation of metal films, alloy evaporation, sputtering and annealing may be employed to realize the ohmic contacts.

Several fundamental phenomena, other than free-carrier absorption, may be utilized to change the refractive index in the phase control or DBR section discussed above. It is preferred to achieve the highest ratio of change in the real part of the refractive index to the change in the imaginary part (i.e., loss) so that the associated phase shift causes minimum additional loss over the background material loss. In other words, the additional loss, $-\Delta\alpha$, due to the change in refractive index, $\Delta n$, should be minimized. One exemplary method would be to use multiple quantum wells (MQW) waveguides and to tune the structure by applying an electrical field thereto. This would be more desirable since lower material losses and smaller dependence of loss on refractive index have been demonstrated with MQW waveguides. See, for example, R. J. Deri et al., *Appl. Phys. Lett.*, Vol 54, No. 18, pp. 1737-39 (1989). For example, for MQW waveguides, the ratio of the real part of the refractive index to the imaginary part is ~20 times larger than when tuning is achieved by current injection.

In order to better understand the performance of optical filter 100, it is interesting to note the affects of various physical parameters. Calculations indicate that for large values of $\kappa L_{dbr}$ the effects of any loss in the waveguide would be amplified, while if it is too small, there will not be a strong resonance, resulting in a diminution in the peak resonance transmission. Desirably, the phase control section should be long enough to provide continuous tuning, but sufficiently short in order to minimize the loss therein. Of particular interest is the fact that if the reflectivity of the mirror is substantially greater than the maximum reflectivity of the grating, then the transmission decreases since incident light at the resonant frequency will be reflected rather than transmitted. It should be recalled that the mirror should have a reflectivity comparable to the peak reflectivity of the Distributed Bragg Reflector so that a sufficiently strong resonance exists in order that the optical filter exhibits a single transmission peak. Values for the reflectivities of the mirror and the Distributed Bragg Reflector are predicated upon factors such as the acceptable crosstalk level, required peak-to-valley ratio and coupling loss, as well as other factors.

Since optical filter 100 does not employ an active section region, several practical advantages are realized. For example, without an active material present in the structure, the output power level varies linearly with the input power level, unlike prior art Distributed Feedback or Distributed Bragg Reflector laser based filters whose optical gain is nonlinear with input power level. While it is true that in filters employing gain the biasing current may be adjusted to compensate for the nonlinearity, such compensation techniques are not trivial and, moreover, are costly. It should also be noted that there is no spontaneous emission noise since a passive waveguide region is employed.

It is anticipated that the present optical filter will be useful in numerous applications. For example, it may be used as a tunable front end filter in a photonic integrated circuit. With an expected frequency switching time of a few nanoseconds, the optical filter is practical not only for transmission applications, such as in wavelength division multiplexed systems, but also switching applications.

It should be understood that materials from the semiconductor Group II-VI and III-V systems may be used in fabricating the DBR and phase control sections, i.e., the passive waveguide region. Also, various modifications may be made by those skilled in the art which will embody the principles of the invention and fall within the spirit and scope thereof. For instance, it is contemplated that by varying the periodicity of the grating or by tapering the grating strength, the transmission peak can be designed to be sharper, flatter and narrower and, moreover, that the peak-to-sidelobe ratio can be increased for higher frequency selectivity.

We claim:

1. An optical filter comprising:
   a passive waveguide region having an end facet, said passive waveguide region for supporting the propagation of an optical signal;
   a Distributed Bragg Reflector having a peak reflectivity, said Distributed Bragg Reflector disposed on a surface of said passive waveguide region, said surface substantially parallel to the propagation direction of said optical signal;
   means for varying the effective refractive index of said passive waveguide region to wavelength shift a transmission characteristic of said optical filter; and
   a mirror on said end facet, said mirror having a reflectivity related to the peak reflectivity of said Distributed Bragg Reflector for a sufficiently strong resonance to exist between said mirror and said Distributed Bragg Reflector so that said optical filter exhibits substantially a single transmission peak.

2. The optical filter as defined in claim 1 wherein said means for varying the effective refractive index includes a pair of contacts for applying a voltage across a predetermined portion of said passive waveguide region.

3. The optical filter as defined in claim 2 wherein said predetermined portion is located between said Distributed Bragg Reflector and said mirror.

4. The optical filter as defined in claim 2 wherein said predetermined portion is located substantially underneath said Distributed Bragg Reflector.

5. The optical filter as defined in claim 1 wherein said mirror includes a dielectric film.

6. The optical filter as defined in claim 1 wherein said mirror includes a metallic film.

7. The optical filter as defined in claim 5 or 6 wherein said passive waveguide region includes a semiconductor waveguide.

8. The optical filter as defined in claim 7 wherein said semiconductor waveguide includes a multiple quantum well.

9. The optical filter as defined in claim 5 or 6 wherein said passive waveguide region includes a lithium niobate waveguide.

* * * * *